(12) United States Patent
Wyckoff

(10) Patent No.: US 9,197,360 B2
(45) Date of Patent: Nov. 24, 2015

(54) SYSTEMS AND METHODS FOR REDUCING A RELATIVELY HIGH POWER, APPROXIMATELY CONSTANT ENVELOPE INTERFERENCE SIGNAL THAT SPECTRALLY OVERLAPS A RELATIVELY LOW POWER DESIRED SIGNAL

(71) Applicant: The Aerospace Corporation, El Segundo, CA (US)

(72) Inventor: Peter S. Wyckoff, Scottsdale, AZ (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/262,532

(22) Filed: Apr. 25, 2014

(65) Prior Publication Data

US 2015/0311999 A1    Oct. 29, 2015

(51) Int. Cl.
*H04B 7/10* (2006.01)
*H04L 1/00* (2006.01)
*H04B 17/00* (2015.01)

(52) U.S. Cl.
CPC ............ *H04L 1/0036* (2013.01); *H04B 17/005* (2013.01)

(58) Field of Classification Search
USPC .............. 375/316, 340, 346, 348; 455/67.13
See application file for complete search history.

(56) References Cited

U.S. PATENT DOCUMENTS

| 6,266,633 | B1 * | 7/2001 | Higgins et al. ................ 704/224 |
| 7,266,166 | B2 | 9/2007 | Henttu |
| 8,515,335 | B2 | 8/2013 | Dafesh et al. |
| 2002/0094022 | A1 | 7/2002 | Bially et al. |
| 2004/0028222 | A1 * | 2/2004 | Sewell et al. ................... 380/28 |
| 2009/0191827 | A1 * | 7/2009 | Hellberg ..................... 455/127.5 |
| 2012/0140685 | A1 * | 6/2012 | Lederer et al. ................ 370/286 |

FOREIGN PATENT DOCUMENTS

EP    0 393 542 A2    10/1990

OTHER PUBLICATIONS

Caijie et al., "Rejection of frequency sweeping interference in DSSS systems using improved polar exciser algorithm," IEEE, 1228-1231 (2007).

(Continued)

*Primary Examiner* — Khanh C Tran
(74) *Attorney, Agent, or Firm* — Jones Day; Jaime D. Choi

(57) ABSTRACT

Systems and methods are provided for processing time-domain samples of a digitized signal in rectangular coordinates. The digitized signal can include a low power desired signal and a high power, approximately constant envelope interference signal that spectrally overlaps the desired signal. A rectangular to polar converter can obtain magnitude and phase of each time-domain sample in polar coordinates. An interference estimator can estimate a magnitude of the interference signal based on magnitudes of a predetermined number of time-domain samples in polar coordinates. A subtractor can obtain a difference magnitude for each time-domain sample in polar coordinates based on the magnitude of that sample and the estimated magnitude of the interference signal in polar coordinates. A polar to rectangular converter can obtain time-domain samples in rectangular coordinates of the desired signal with reduced power of the interference signal based on the difference magnitude and phase of time-domain samples in polar coordinates.

18 Claims, 11 Drawing Sheets

(56) References Cited

OTHER PUBLICATIONS

Ferrara, A method for cancelling interference from a constant envelope signal, IEEE, 33(1):316-319 (1985).

Henttu, "A new interference suppression algorithm against broadband constant envelope interference," IEEE, 2:742-746 (2000).

Hui et al, "Maximum likelihood sequence estimation in the presence of constant envelope interference," IEEE, 2:1060-1064 (2003).

Pasupathy, "Compact power spectrum, good error rate performance, and easy synchronization make MSK an attractive digital modulation technique," IEEE Communications Magazine, 17:14-22 (1979).

Pouttu et al., "Effects of Rayleigh fading to method-selection in interference suppression," IEEE, 2:1225-1230 (2005).

Raustia, "Combining method for FH-DS communications," IEEE, 4:2289-2293 (2005).

Amin, "Interference mitigation in spread spectrum communication systems using time-frequency distributions," IEEE Trans. Signal Processing 45(1):90-101 (1997).

Amoroso, "Adaptive A/D Converter to Suppress CW Interference in DSPN Spread-Spectrum Communications," IEEE Trans. Commun. COM-31(10):1117-1123 (1983).

Capozza et al., "Measured Effects of a Narrowband Interference Suppressor on GPS Receivers," ION 55th Annual Meeting, Cambridge, MA, pp. 1-7 (1999).

Choi et al., "Suppression of narrow-band interference in DS-spread spectrum systems using adaptive IIR notch filter," Signal Process. 82(12):2003-2013 (2002).

Dipietro, "An FFT based technique for suppressing narrow-band interference in PN spread spectrum communications systems," International Conference on Acoustics, Speech, and Signal Processing 2:1360-1363 (1989).

Gelli et al., "Cyclostationarity-based filtering for narrowband interference suppression in direct-sequence spread-spectrum systems," IEEE J. Select. Areas Commun. 16(9):1747-1755 (1998).

Ketchum et al., "Adaptive algorithms for estimating and suppressing narrow-band interference in PN spread-spectrum systems," IEEE Trans. Commun. 30(5):913-924 (1982).

Ouyang et al., "Short-time Fourier transform receiver for nonstationary interference excision in direct sequence spread spectrum communications," IEEE Trans. Signal Processing 49(4):851-863 (2001).

Pouttu et al., "Synchronization of FH/DS Signal with Interference Suppression Diversity," IEEE Ninth International Symposium on Spread Spectrum Techniques and Applications pp. 69-73 (2006).

Przyjemski et al., "GPS Anti-Jam Enhancement Techniques," Proc. ION 49th Annual Meeting, pp. 41-50 (1993).

Ward, "Interference & Jamming: (Un)intended Consequences," TLS NovAtel's Thought Leadership Series, pp. 28-29 (2012).

\* cited by examiner

SYSTEMS AND METHODS FOR REDUCING A RELATIVELY HIGH POWER, APPROXIMATELY CONSTANT ENVELOPE INTERFERENCE SIGNAL THAT SPECTRALLY OVERLAPS A RELATIVELY LOW POWER DESIRED SIGNAL

FIELD OF THE INVENTION

This application relates to systems and methods for reducing an interference signal that spectrally overlaps with a desired signal.

BACKGROUND OF THE INVENTION

Strong interference has become a common problem as the radio spectrum has become more crowded. Constant envelope, or approximately constant envelope signals are popular because such waveforms are compatible with non-linear amplifiers which can be more energy efficient than linear amplifiers. Examples of constant envelope signals include: frequency modulation, frequency shift keying, minimum shift keying, Gaussian minimum shift keying, multi-h continuous phase frequency modulation, linear FM, continuous wave, and many frequency hopping signals. Any of these types of constant envelope signals can cause interference with other, desired signals, particularly where the desired signal and the constant envelope signal spectrally overlap with one another.

Because constant envelope interference is wide-spread in practical applications, numerous approaches have been devised to mitigate strong constant envelope co-channel interference received using a single receive antenna. Maximum likelihood sequence estimation (MLSE) in the presence of constant envelope interference is one known technique with a reasonably simple hardware implementation. See, for example, Hui et al., "Maximum Likelihood Sequence Estimation in the Presence of Constant Envelope Interference," IEEE Vehicular Technology Conference 2: 1060-1064 (2003), the entire contents of which are incorporated by reference herein. However, the MLSE algorithm or hardware must be customized for the specific desired signal.

Another approach uses an adaptive filter to cancel interference caused by a constant envelope signal. This adaptive approach requires time to converge, and even then a narrow band signal buried beneath a wide-band strong interference signal might not be recovered because the steady state transfer function is frequency selective. See, for example, Ferrara, "A Method for Cancelling Interference from a Constant Envelope Signal," IEEE Transactions on Acoustics, Speech, and Signal Processing 33(1): 316-319 (1985), the entire contents of which are incorporated by reference herein.

A different approach maps a complex received signal into polar coordinates. Then a fast Fourier transform (FFT) is computed on a block of magnitude samples. The spectrum of the magnitude samples is then excised. An inverse FFT (iFFT) then transforms the excised spectrum into the time-domain. Such an approach does not require convergence time or any parameters of the weak signal, and can cancel many interference signals automatically. See, for example, Henttu, "A New Interference Suppression Algorithm Against Broadband Constant Envelope Interference," IEEE Milcom 2: 742-746 (2000), the entire contents of which are incorporated by reference herein. However, such an approach can be computationally complex.

Or, for example, successive interference cancellation can require demodulating the undesired interference signal in order to subtract the interference. Joint demodulators can mitigate interference by demodulating both signals together in a statistically optimum manner such as least squares estimation. In either case, a demodulator for one desired signal type can then require demodulators for many different undesired signal types. As new signals emerge then algorithms must be updated. Unknown signals, such as proprietary waveforms, might render successive interference cancellation or joint demodulators impractical.

Thus, what is needed are improved systems and methods for reducing constant envelope interference.

SUMMARY OF THE INVENTION

Embodiments of the present invention provide systems and methods for reducing a relatively high power, approximately constant envelope interference signal that spectrally overlaps a relatively low power desired signal. More specifically, the present systems and methods can suppress approximately constant envelope interference in a simplified manner, requiring fewer steps and fewer computational resources, and can flexibly be applied to a wide variety of signals without the need to customize the system or method based on the particular type of desired signal or interference signal.

Under one aspect of the present invention, a system is provided for processing time-domain samples of a digitized signal in rectangular coordinates. The digitized signal can include a relatively low power desired signal and a relatively high power, approximately constant envelope interference signal that spectrally overlaps the desired signal. The system can include a rectangular to polar converter configured to obtain a magnitude and a phase of each time-domain sample of the digitized signal in polar coordinates. The system also can include an interference estimator configured to estimate a magnitude of the interference signal based on the respective magnitudes of a predetermined number of the time-domain samples of the digitized signal in polar coordinates. The system also can include a subtractor configured to obtain a difference magnitude for each of the time-domain samples in polar coordinates based on the magnitude of that sample and the estimated magnitude of the interference signal in polar coordinates. The system also can include a polar to rectangular converter configured to obtain time-domain samples in rectangular coordinates of the desired signal with reduced power of the interference signal based on the difference magnitude and the phase of respective time-domain samples in polar coordinates.

In some embodiments, the interference estimator is configured to estimate the magnitude of the interference signal based on an average of the magnitudes of the predetermined number of the time-domain samples of the digitized signal in polar coordinates. The average can be a running average.

The interference estimator can include an arithmetic circuit. The subtractor can include an arithmetic circuit.

The envelope of the interference signal can be constant over at least ten of the time-domain samples of the digitized signal. For example, the envelope of the interference signal can be constant over at least 100 of the time-domain samples of the digitized signal.

The power of the interference signal can be at least ten times as large as the power of the desired signal. For example, the power of the interference signal can be at least 100 times as large as the power of the desired signal.

Some embodiments further include an antenna and an analog-to-digital converter. The antenna can be configured to receive an analog, time-domain signal including the relatively low power desired signal and the relatively high power, approximately constant envelope interference signal that spectrally overlaps the desired signal. The analog-to-digital converter can be configured to digitize the analog, time-domain signal to form the digitized signal.

Under another aspect of the present invention, a method for processing time-domain samples of a digitized signal in rectangular coordinates is provided. The digitized signal can include a relatively low power desired signal and a relatively high power, approximately constant envelope interference signal that spectrally overlaps the desired signal. The method can include obtaining a magnitude and a phase of each time-domain sample of the digitized signal in polar coordinates. The method also can include estimating a magnitude of the interference signal based on the respective magnitudes of a predetermined number of the time-domain samples of the digitized signal in polar coordinates. The method also can include obtaining a difference magnitude for each of the time-domain samples in polar coordinates based on the magnitude of that sample and the estimated magnitude of the interference signal in polar coordinates. The method also can include obtaining time-domain samples in rectangular coordinates of the desired signal with reduced power of the interference signal based on the difference magnitude and the phase of respective time-domain samples in polar coordinates.

DETAILED DESCRIPTION

Embodiments of the present invention provide systems and methods for reducing a relatively high power, approximately constant envelope interference signal that spectrally overlaps a relatively low power desired signal. For example, if two signals share a channel, that is, if they spectrally overlap with one another, and if one signal is much stronger than the other, then the strong signal is typically easy to detect and demodulate. However, the weaker signal can be lost in the interference caused by the stronger signal. Reducing interference caused by the stronger signal can allow more signals to share a given region of the spectrum and can provide the opportunity for users to use whatever portion of the spectrum is needed whenever it is needed. As described in greater detail herein, the present systems and methods need not require detailed knowledge of the undesired or desired signals, and as such, readily can be implemented in a variety of practical applications. In particular, the present systems and methods can be implemented using simpler hardware, and fewer processing steps, than previously known techniques such as mentioned above or disclosed by Hui, Ferrara, or Henttu. For example, the present systems and methods need not transform a time-domain signal into the frequency domain for spectral analysis, such as disclosed by Henttu. Instead, the present systems and methods can reduce the effect of interference within a time-domain signal by transforming samples of that signal into polar coordinates, estimating the magnitude of interference within those samples based on the magnitudes of a predetermined number of those samples, subtract the estimated magnitude of the interference from the magnitude of each sample in polar coordinates without changing the phase of that sample, and then transform that sample back to rectangular coordinates. As discussed in greater detail below, the interference reduction performance provided by the present systems and methods can improve as the power of the interference signal increases relative to the power of the desired signal.

First, systems and methods for reducing a relatively high power, approximately constant envelope interference signal that spectrally overlaps a relatively low power desired signal will be described. Then, computational models and performance results thereof will be described. Alternative embodiments, including an exemplary hardware implementation and performance results thereof, also will be described.

Figure 1A:
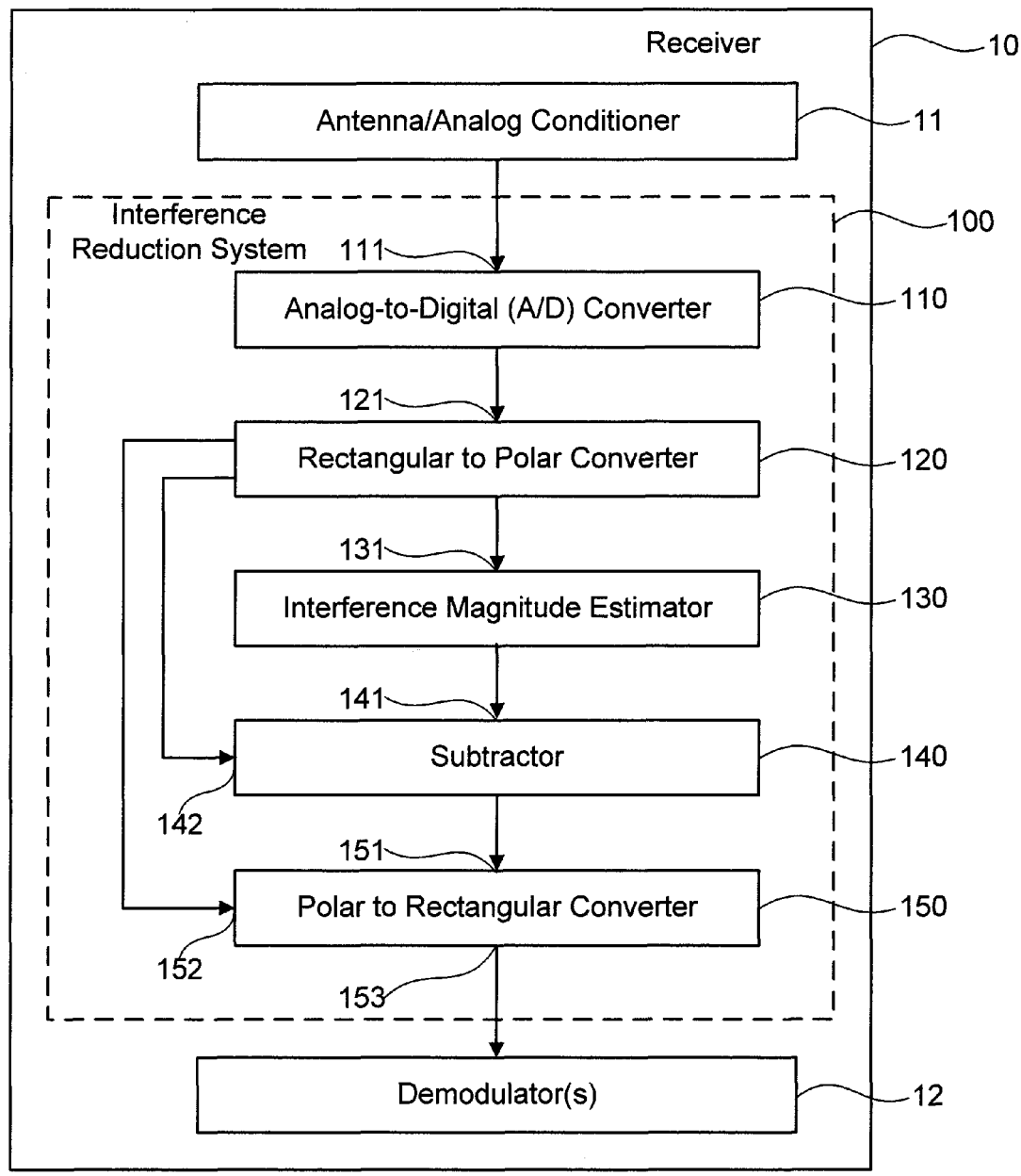
FIG. 1A illustrates a system for reducing a relatively high power, approximately constant envelope interference signal that spectrally overlaps a relatively low power desired signal in a receiver, according to some embodiments of the present invention.

Systems for Processing Digitized Signals Including Low Power Desired Signals and High Power, Approximately Constant Envelope Interference Signals that Spectrally Overlap the Desired Signals FIG. 1A illustrates a system for reducing a relatively high power, approximately constant envelope interference signal that spectrally overlaps a relatively low power desired signal in a receiver, according to some embodiments of the present invention. For example, FIG. 1C illustrates an exemplary high power, approximately constant envelope interference signal that spectrally overlaps an exemplary relatively low power desired signal. It can be seen that the "strong signal" in FIG. 1C, corresponding to the approximately constant envelope interference signal, can have a power that is thousands of times stronger than the "weak signal," corresponding to the desired signal. Additionally, noise such as additive white Gaussian noise (AWGN) can be added to the signals, which can further obscure the desired signal. The power of the interference signal can be significantly larger than the desired signal, e.g., at least about ten times larger than the power of the desired signal, or at least about 100 times larger than the power of the desired signal, or at least about 1000 times larger than the power of the desired signal, or at least about 10,000 times larger than the power of the desired signal, or at least about 100,000 times larger than the power of the desired signal. As used herein, unless otherwise noted, the terms "about" and "approximately" are intended to mean within 10% of the stated value.

Referring again to FIG. 1A, receiver 10 can include an antenna/analog conditioner 11 configured to receive the interference signal and the desired signal, e.g., the signals illustrated in FIG. 1C; one or more demodulators 12 configured to decode the information contained within the received signals; and interference reduction system 100 disposed therebetween. In the illustrated embodiment, interference reduction system 100 includes analog-to-digital (A/D) converter 110 connected to antenna/analog conditioner 11 via input port 111; rectangular to polar converter 120 connected to A/D converter 110 via input port 121; interference magnitude estimator 130 coupled to rectangular to polar converter 120 via input port 131; subtractor 140 coupled to interference magnitude estimator 130 via input port 141 and coupled to rectangular to polar converter 120 via input port 142; and polar to rectangular converter 150 coupled to subtractor 140 via input port 151, coupled to rectangular to polar converter 120 via input port 152, and coupled to demodulator(s) 12 via output port 153.

Antenna/analog conditioner 11 illustrated in FIG. 1A can be configured to wirelessly receive an analog, time-domain signal that includes the relatively low power desired signal and the relatively high power, approximately constant envelope interference signal that spectrally overlaps the desired signal, in rectangular coordinates. For example, antenna/analog conditioner 11 can be configured to receive the time-domain analog signal, which can fall within a pre-defined spectral band, and antenna/analog conditioner 11 can include one or more filters configured to block signals having frequencies that fall outside of this band. Appropriate antenna designs for a variety of signals in a variety of contexts, e.g., terrestrial, aircraft, or space-based antennas, are known in the art. In some embodiments, antenna/analog conditioner 11 can be a pre-existing structure to which inventive system 100 can be coupled. Antenna/analog conditioner 11 also can include an input radio frequency (RF) filter to select the bandwidth containing desired signal components and reject other signals at frequencies outside of that bandwidth, a low noise amplifier to establish the system noise level, and can contain one or more downconverters to translate the RF bandwidth containing the user signals into the bandwidth over which the A/D 110 operates. Such components can be considered together to constitute analog conditioning circuitry.

A/D converter 110 can include input port 111 configured to be coupled to antenna/analog conditioner 11 via a suitable element (not specifically illustrated), such that A/D converter receives the time-domain analog signal received and suitably processed by antenna/analog conditioner 11. The element can include a conductive element such as a coaxial cable, a transmission line, or any other suitable conductor configured to transmit signals within the pre-defined spectral band from antenna/analog conditioner 11 to A/D converter 110 via input port 111. Note, however, that the element can include any path suitably configured to transmit the time-domain analog signal from antenna/analog conditioner 11 to A/D converter 110 and need not necessarily include a continuous conductor, e.g., the element can include a capacitor or transformer.

A/D converter 110 is configured to digitize and quantize the analog, time-domain signal that it receives from antenna/analog conditioner 11, in rectangular coordinates. As known to those of skill in the art of digital signal processing, A/D converters are commercially available devices that generate a digital version of an analog signal by sampling that signal at a specified rate. Note that in some embodiments, antenna/analog conditioner 11 can include its own A/D converter configured to digitize the received signals, or even can receive the desired group of signals in a digital format, in which circumstances A/D converter 110 can be omitted from system 100, and antenna/analog conditioner 11 instead can be directly coupled to rectangular to polar converter 120. In embodiments including A/D converter 110, the converter provides as output to rectangular to polar converter 120 via input port 121 and a suitable path (not specifically illustrated) digitized time-domain samples of the analog, time domain signal in rectangular coordinates. In one exemplary embodiment, antenna/analog conditioner 11 includes an analog quadrature downconverter, and A/D converter 110 includes two parallel A/D converters that provide as output to rectangular to polar converter 120 digitized time-domain samples of the analog, time domain signal in rectangular coordinates.

In the embodiment illustrated in FIG. 1A, rectangular to polar converter 120 is configured to receive the time-domain samples of the digitized signal from A/D converter 110 via input port 121 and any suitable path, and to obtain a magnitude and a phase of each time-domain sample of the digitized signal in polar coordinates. Rectangular to polar converter 120 can be configured to provide the magnitude of each digitized time-domain sample in polar coordinates to interference magnitude estimator 130 via input port 131 as well as to subtractor 140 via input port 142 and respectively suitable paths, and can be configured to provide the phase of each time-domain sample in polar coordinates to polar to rectangular converter 150 via input port 152 and any suitable path. Note that in some embodiments, A/D converter 110 can receive and digitize signals having magnitude and phase that are already in polar coordinates, in which circumstances rectangular to polar converter 120 can be omitted from system 100, and A/D converter 110 can be configured to provide the magnitude of each digitized time-domain sample in polar coordinates to interference magnitude estimator 130 via input port 131 as well as to subtractor 140 via input port 142, and can be configured to provide the phase of each time-domain sample in polar coordinates to polar to rectangular converter 150 via input port 152, via any respectively suitable paths.

Interference magnitude estimator 130 is configured to receive the magnitudes of the time-domain samples from rectangular to polar converter 120 via input port 121 and any suitable path, and to estimate a magnitude of the interference signal based on the respective magnitudes of a predetermined number of the time-domain samples in polar coordinates. For example, as described in greater detail below, interference magnitude estimator 130 can be configured to estimate the magnitude of the interference signal in polar coordinates based on an average, e.g., a running average, of the magnitudes of the pre-determined number of the time-domain samples in polar coordinates. Exemplary hardware implementations of interference magnitude estimator 130 include suitably configured infinite impulse response (IIR) filters, finite impulse response (FIR) filters, and arithmetic circuits configured to calculate a weighted average of a pre-determined number of samples. Because the magnitude of the interference signal is high relative to the magnitude of desired signal, the average magnitude of the pre-determined number of the time-domain samples can be assumed to be approximately equal to the magnitude of the interference signal over a sufficient number of those samples. Put another way, the pre-determined number of the time-domain samples can be selected based on the number of samples over which the envelope signal is approximately constant (e.g., over which the envelope signal is within 10% of an average value of the envelope signal). For example, based on the envelope of the interference signal being constant or approximately constant over at least ten of the time-domain samples of the digitized signal, the pre-determined number can be ten, or more than ten. Or, for example, based on the envelope of the interference signal being constant or approximately constant over at least 100 of the time-domain samples of the digitized signal, the pre-determined number can be 100, or more than 100. Or, for example, based on the envelope of the interference signal being constant or approximately constant over at least 1000 of the time-domain samples of the digitized signal, the pre-determined number can be 1000, or more than 1000. Alternatively, the pre-determined number of samples can be based on Cramer-Rao bound known in the art.

Subtractor 140 is configured to receive the estimated magnitude of the interference signal in polar coordinates from interference magnitude estimator 130 via input port 141 and any suitable path, and to receive the magnitude for each of the time-domain samples from rectangular to polar converter 120 via input port 142 and any suitable path. Subtractor 140 also is configured to determine a difference magnitude for each of the time-domain samples in polar coordinates based on the magnitude of that sample and the estimated magnitude of the interference signal in polar coordinates. For example, subtractor 140 can be configured to subtract the estimated magnitude of the interference signal from the magnitude of each sample in polar coordinates. The difference magnitude can correspond to the magnitude of the desired signal itself, with reduced contribution from the interference signal and optionally with noise, for each particular sample of that signal.

Polar to rectangular converter 150 is configured to receive the difference magnitude for each time-domain sample in polar coordinates from subtractor 140 via input port 151 and any suitable path, and to receive the phase for each time-domain sample in polar coordinates from rectangular to polar converter 120 via input port 152 and any suitable path. Polar to rectangular converter 150 also is configured to obtain time-domain samples in rectangular coordinates of the desired signal with reduced power of the interference signal based on the difference magnitude and the phase of respective time-domain samples in polar coordinates. Polar to rectangular converter 150 outputs the desired signal with reduced power of the interference signal, in rectangular coordinates, to demodulator(s) 12 via output port 153. For example, FIG. 1D illustrates the exemplary relatively low power desired signal of FIG. 1C following reduction of the exemplary interference signal of FIG. 1C using the system of FIG. 1A or the method of FIG. 2. Because interference reduction system 100 reduces the amount of interference that demodulator(s) 12 receive, demodulator(s) 12 can demodulate the desired signal with a significantly lower bit error rate (BER) than otherwise may be possible without the use of system 100. Note that in some receivers, the demodulator(s) can accept signal samples in polar coordinates, in which case polar to rectangular converter 150 suitably can be omitted.

Note that A/D converter 110, rectangular to polar converter 120, interference magnitude estimator 130, subtractor 140, and polar to rectangular converter 150 can be implemented using any suitable logic circuits or components known in the art. For example, hardware circuits for performing A/D conversion are readily commercially available. Or, for example, circuits for performing rectangular to polar conversion or polar to rectangular conversion are readily commercially available. Or, for example, interference magnitude estimator 130 or subtractor 140 suitably can be implemented using arithmetic circuits that are known in the art and are commercially available. Alternatively, interference magnitude estimator 130 can be implemented using a filter configured to average the magnitudes of the signal samples, such as an IIR filter or FIR filter. Any such hardware components suitably can be coupled together with any suitable paths, such as conductive elements or non-conductive elements. In other embodiments, the functionalities of one or more of A/D converter 110, rectangular to polar converter 120, interference magnitude estimator 130, subtractor 140, and polar to rectangular converter 150 can be provided by a suitably programmed field-programmable gate array (FPGA) or application-specific integrated circuit (ASIC). FPGAs and ASICs are commercially available, and methods of programming same to achieve desired logical programming are known in the art. In still other embodiments, the functionalities of one or more of A/D converter 110, rectangular to polar converter 120, interference magnitude estimator 130, subtractor 140, and polar to rectangular converter 150 can be provided by a suitably programmed computer, e.g., a personal computer including a processor and a non-transitory computer-readable medium storing instructions to cause the processor to perform the steps of the present methods or to implement the functionality of the present systems. Additionally, note that circuitry other than A/D converter 110, rectangular to polar converter 120, interference magnitude estimator 130, subtractor 140, and polar to rectangular converter 150 can be used to provide interference reduction system 100 with functionality analogous to that described herein.

Figure 1B:
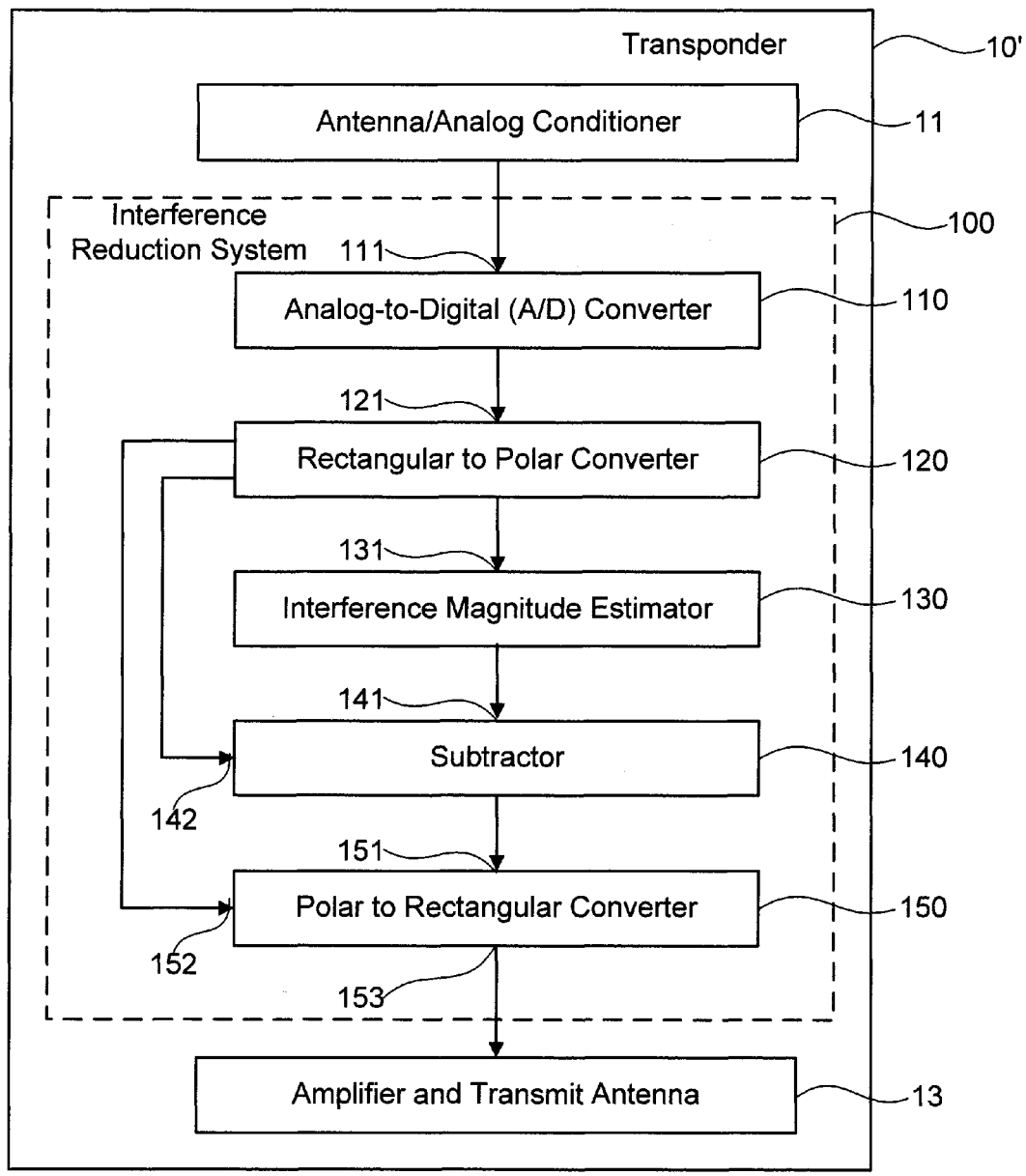
FIG. 1B illustrates a system for reducing a relatively high power, approximately constant envelope interference signal that spectrally overlaps a relatively low power desired signal in a transponder, according to some embodiments of the present invention.
Figure 1C:
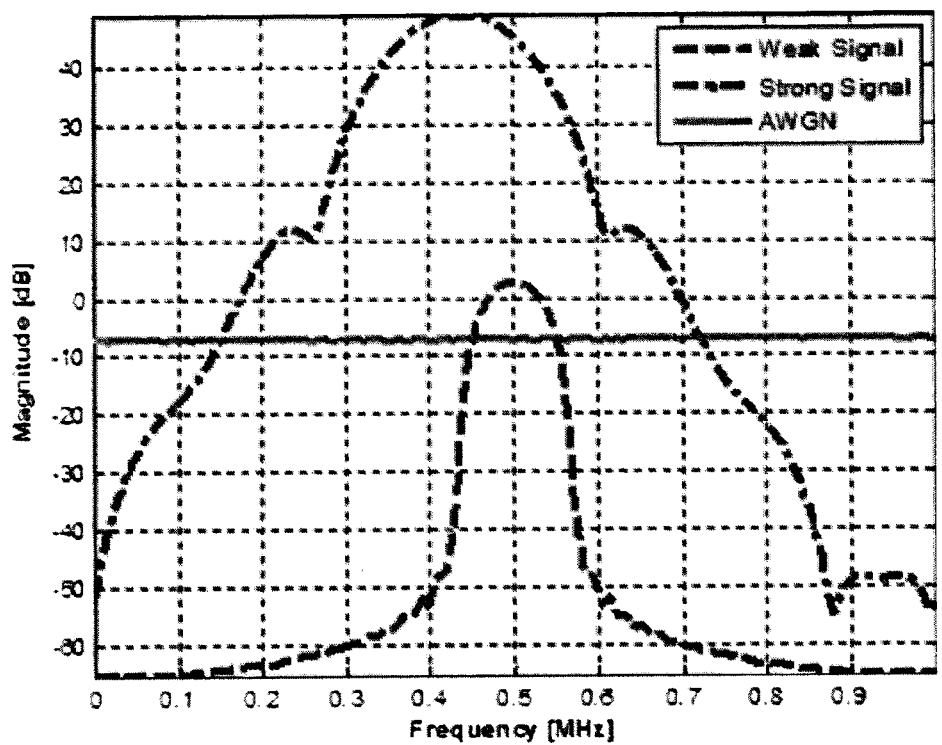
FIG. 1C illustrates an exemplary high power, approximately constant envelope interference signal that spectrally overlaps an exemplary relatively low power desired signal.
Figure 1D:
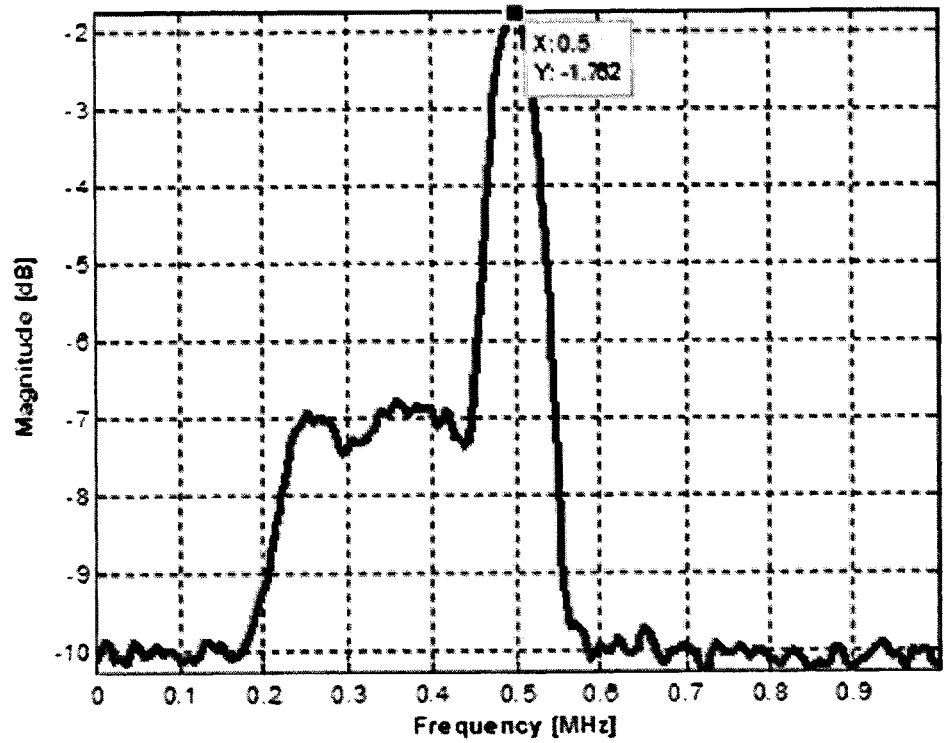
FIG. 1D illustrates the exemplary relatively low power desired signal of FIG. 1C following reduction of the power of the exemplary interference signal of FIG. 1C using the system of FIG. 1A or the method of FIG. 2.

In an alternative embodiment, transponder 10' illustrated in FIG. 1B is configured similarly to receiver 10 illustrated in FIG. 1A, but is configured to transmit the desired signal with reduced power of the interference signal, in rectangular coordinates, to a remote user for remote demodulation, rather than locally demodulating the signals. In transponder 10', polar to rectangular converter 150 is configured to provide its output to amplifier and transmit antenna(s) 13, e.g. via output port 153. Amplifier and transmit antenna(s) 13 then amplify and transmit the received signal to one or more individual user(s), each of whom can have his own demodulator(s) 12. As will be recognized by those skilled in the art, the amplitifer and transmit antenna(s) suitably can include a digital-to-analog converter and a frequency up-converter to translate the user signals into an analog RF signal. Appropriate antenna designs for a variety of signals in a variety of contexts, e.g., terrestrial, aircraft, or space-based antennas, are known in the art.

Methods for Processing Digitized Signals Including Low Power Desired Signals and High Power, Approximately Constant Envelope Interference Signals that Spectrally Overlap the Desired Signals An exemplary method for processing a signal including a relatively low power desired signal and a relatively high power, approximately constant envelope interference signal that spectrally overlaps the desired signal now will be described in greater detail with reference to FIGS. 2 and 3.

Figure 2:
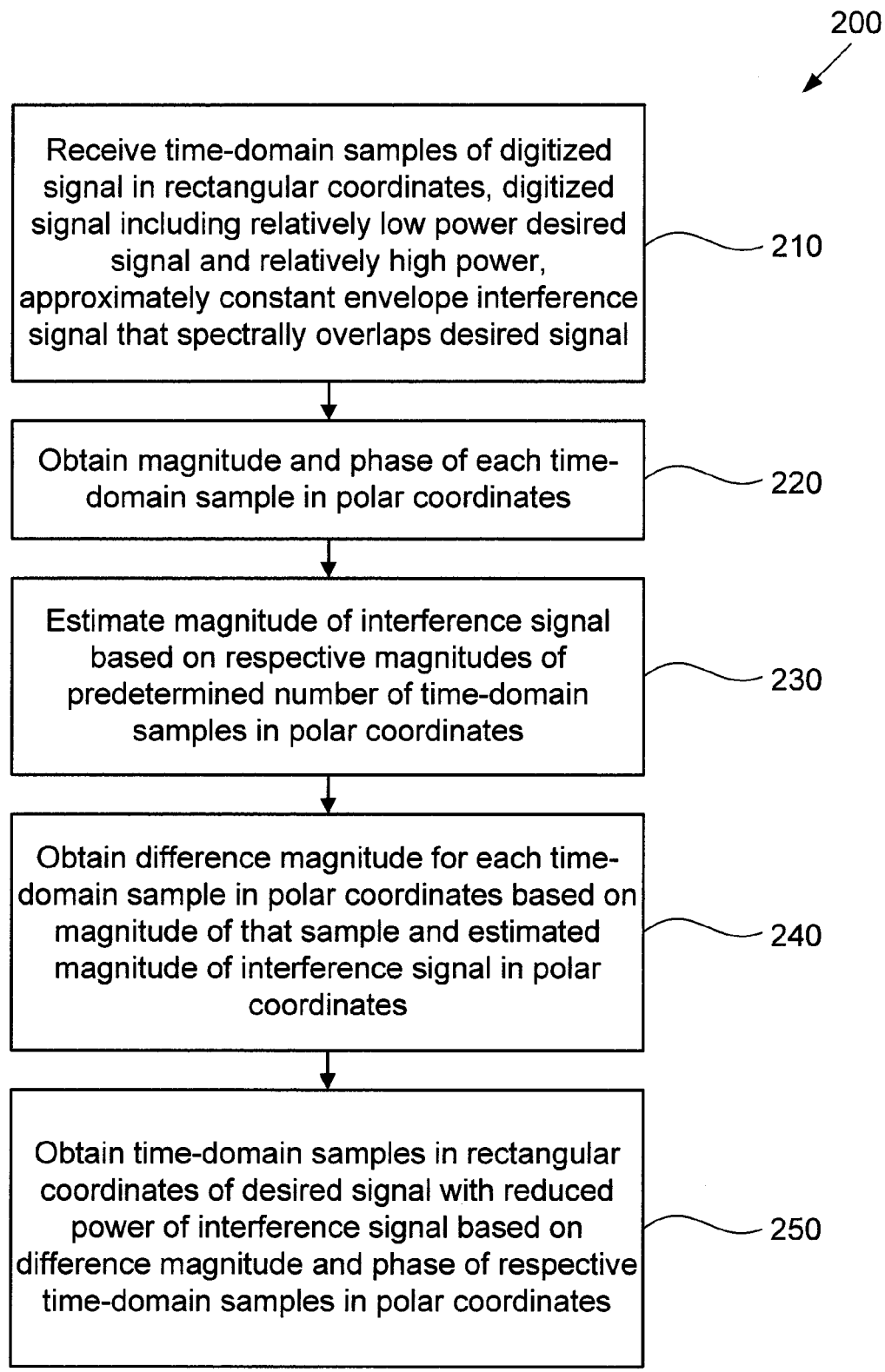
FIG. 2 illustrates a method for reducing a relatively high power, approximately constant envelope interference signal that spectrally overlaps a relatively low power desired signal, according to some embodiments of the present invention.

FIG. 2 illustrates an exemplary method 200 for reducing a relatively high power, approximately constant envelope interference signal that spectrally overlaps a relatively low power desired signal, according to some embodiments of the present invention. Method 200 can include receiving time-domain samples of a digitized signal in rectangular coordinates (step 210). The digitized signal sample includes a relatively low power desired signal and a relatively high power, approximately constant envelope interference signal that spectrally overlaps the desired signal. For example, as noted above with reference to FIG. 1A, an analog, time-domain signal including the desired signal and the interference signal can be received by antenna/analog conditioner 11 and subsequently digitized, e.g., using A/D converter 110. Alternatively, the antenna can receive a digitized time-domain signal, obviating the need for a separate digitization step. FIG. 1C illustrates an exemplary "strong" interference signal, an exemplary "weak" desired signal, and noise such as AWGN that can be added to such signals.

Referring again to FIG. 2, method 200 also includes obtaining the magnitude and phase of each time-domain sample in polar coordinates (step 220). For example, rectangular to polar converter 120 discussed above with reference to FIG. 1A can be configured to receive the time-domain samples of the digitized signal from A/D converter 110 via input port 121, and to obtain a magnitude and a phase of each time-domain sample of the digitized signal in polar coordinates. The time-domain samples can be expressed as:

$$y[n] = s[n] + w[n] \quad (1)$$

where y[n] corresponds the nth sample of the time-domain signal, s[n] corresponds to the strong interference signal for that sample, and w[n] corresponds to a weak signal that includes the low power desired signal and also can include independent, complex noise, e.g., thermal noise or independent complex Gaussian noise. The desired signal can include, for example, a direct sequence spread spectrum. FIG. 3 illustrates an exemplary signal that includes a relatively high power, approximately constant envelope interference signal s[n] that spectrally overlaps a weak signal w[n] that includes a relatively low power desired signal in polar coordinates, as well as thermal noise.

Figure 3:
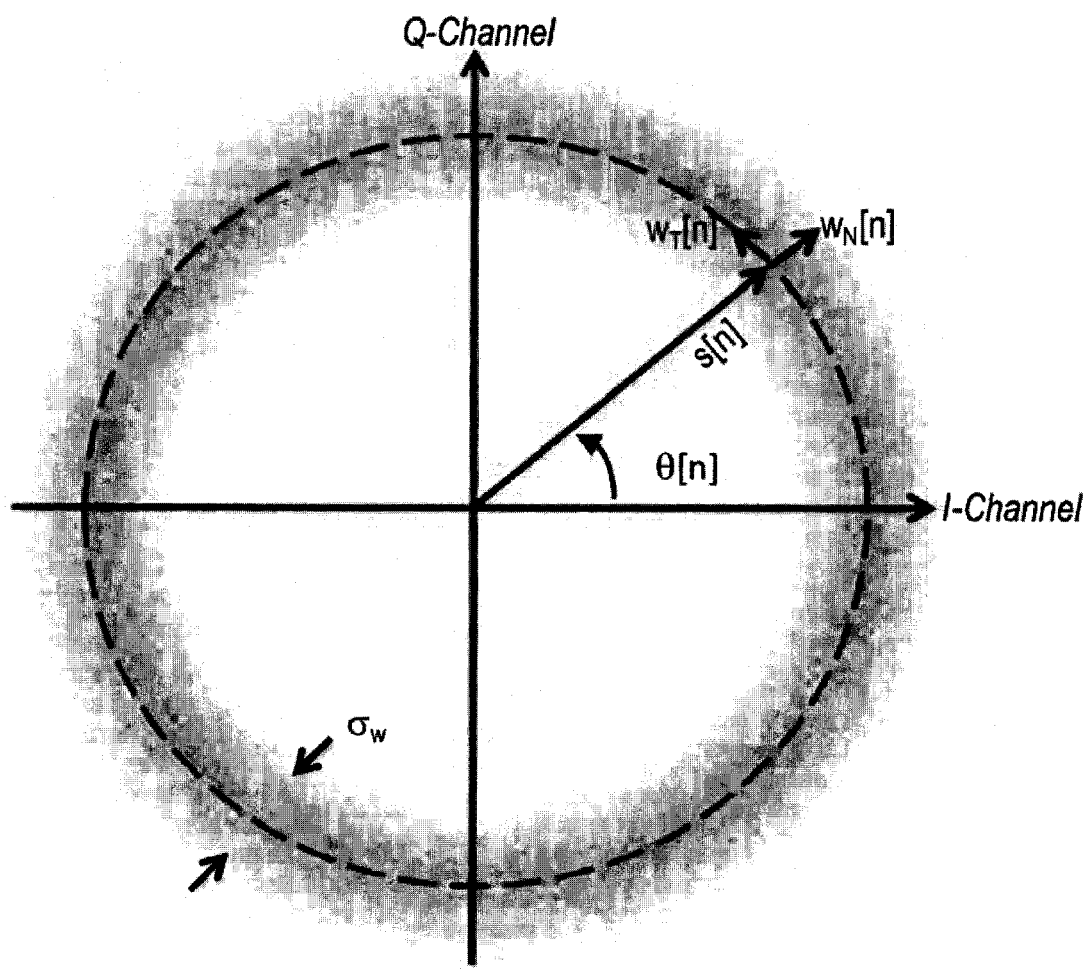
FIG. 3 illustrates an exemplary signal that includes a relatively high power, approximately constant envelope interference signal that spectrally overlaps a relatively low power desired signal in polar coordinates, according to some embodiments of the present invention.

The contributions of the thermal noise and desired signal to w[n] can be seen in FIG. 3 to form a "cloud" of points for different samples about the circle described by radius s[n]. Strong signal s[n] has an approximately constant envelope |s[n]|=A. For generality, the angle of s[n] at each sample can be assumed to be independent and uniformly distributed on [0, 2π). This represents a worst-case bound because some constant envelope signals may not have independent phase on each sample. In polar form, the interference signal can be expressed as:

$$s[n] = A[n] e^{j\theta[n]} \quad (2).$$

To simplify the present discussion, in can be assumed that A[n] is approximately constant over the relevant time period. However, in practice A[n] can vary and performance of the present systems and methods can be based on how well the average of A[n] is estimated, e.g., based on the respective magnitudes of a predetermined number of the time domain samples. Put another way, the radius of circle s[n] can remain substantially constant over a sufficient number of samples, and can be sufficiently large relative to the weak desired signal w[n], that one or more of the approximations and estimates described herein are substantially accurate.

In polar form, the weak desired signal w[n] can be expressed as two orthogonal components $w_N[n]$ and $w_T[n]$, each of which has a time-variant orientation. This particular expression can be convenient for the present analysis, although it is not typical to decompose the phase of the weak signal into vectors that are relative to the instantaneous phase of the strong signal. As illustrated in FIG. 3, one of the weak signal vector components $w_N[n]$ is oriented along, or normal to, the instantaneous phase of s[n]. The other component $w_T[n]$ is oriented π/2 radians from the instantaneous phase of s[n]. The weak signal w[n] therefore can be decomposed into two parts relative to θ[n], which are denoted as normal and tangential relative to the point where s[n] meets the constant magnitude circle with radius A. The term $w_N$ refers to the normal part and $w_T$ refers to the tangential part, and can be expressed as:

$$w[n] = w_N[n] e^{j\theta[n]} + w_T[n] e^{j(\theta[n]+\pi/2)}. \quad (3)$$

The combined strong signal s[n] and weak signal w[n] therefore can be expressed as y[n]:

$$y[n] = (A + w_N[n] + w_T[n] e^{j\pi/2}) e^{j\theta[n]}. \quad (4)$$

Combining the terms of equation (4) can be used to express that the terms $w_T[n]$ and θ[n] interact:

$$y[n] = \sqrt{(A + w_N[n])^2 + w_T^2[n]}\, e^{j(\tan^{-1}(w_T[n]/A + w_N[n]) + \theta[n])}. \quad (5)$$

Because of the power constraint, the variance of the weak signal can be expected to be much less than the variance of the constant envelope signal, e.g., $\sigma_w^2 \ll \sigma_s^2$. Accordingly, because $\sigma_w^2 \ll A^2$, the small angle approximation for tangent can be assumed to be valid, simplifying the expression as follows:

$$y[n] \cong \sqrt{(A + w_N[n])^2 + w_T^2[n]}\, e^{j((w_T[n]/A + w_N[n]) + \theta[n])}. \quad (6)$$

The smallest term in the magnitude, $w_T^2[n]$, can be expected to be very small compared to the other squared term. Therefore the magnitude can be expressed in simplified form as follows:

$$y[n] \cong (A + w_N[n]) e^{j((w_T[n]/A + w_N[n]) + \theta[n])}. \quad (7)$$

Referring again to FIG. 2, the magnitude of the interference signal can be estimated based on the respective magnitudes of a predetermined number of the time-domain samples in polar coordinates (step 230). For example, interference magnitude estimator 130 illustrated in FIG. 1A can be configured to receive the magnitudes of the time-domain samples from rectangular to polar converter 120 via input port 121, and to estimate a magnitude of the interference signal based on the respective magnitudes of a predetermined number of the time-domain samples in polar coordinates. Note that the resulting estimated magnitude can include energy from both the strong signal component s[n] and the weak signal w[n] component. However, the strong signal can be expected to dominate the weak signal in this estimate.

Referring again to FIG. 2, method 200 further includes obtaining a difference magnitude for each of the time-domain samples in polar coordinates based on the magnitude of that sample and the estimated magnitude of the interference signal in polar coordinates (step 240). For example, subtractor 140 illustrated in FIG. 1A can be configured to receive the estimated magnitude of the interference signal in polar coordinates from interference magnitude estimator 130 via input port 141, to receive the magnitude for each of the time-domain samples from rectangular to polar converter 120 via input port 142, and to obtain a difference magnitude for each of the time-domain samples in polar coordinates based on the magnitude of that sample and the estimated magnitude of the interference signal in polar coordinates. For example, subtractor 140 can subtract the interference magnitude estimate from the instantaneous signal sample magnitude. The suppressed output r[n] can be expressed as:

$$r[n] = (A - \hat{A} + w_N[n])e^{j((w_T[n]/A + w_N[n]) + \theta[n])}. \quad (8)$$

Because the magnitude of the strong signal is greater than that the weak signal, equation (8) can be simplified. For example, the effect of the noise component $w_T[n]$ on the phase angle is reduced by the strong signal magnitude A. Because A can be hundreds of times or more larger than $w_T[n]$, the output phase angle can be considered to depend on $\theta[n]$ alone, and r[n] can be expressed as:

$$r[n] = (A - \hat{A} + w_N[n])e^{j(\theta[n])}. \quad (9)$$

An accurate estimate $\hat{A}$ for A, e.g., as estimated by interference magnitude estimator 130 based on the respective magnitudes of a predetermined number of the time-domain samples in polar coordinates, can be defined to be a magnitude that is sufficiently closer to the actual magnitude of A than to the magnitude of $w_N[n]$, which can be obtained based on interference magnitude estimator 130 basing the estimate of A on a sufficient number of signal samples. The number of samples (time-span) over which this estimate is obtained is an important consideration. Preferably, the number of samples (time-span) over which the magnitude is averaged exceeds the inverse bandwidth for the desired weak signal. Averaging over a greater number of samples (time-span) can be beneficial; however, the number of samples (time-span) over which the magnitude is averaged preferably does not exceed the number of samples (time-span) over which the strong interference signal has approximately constant magnitude. The Cramer-Rao lower bound for magnitude estimation standard deviation decreases proportionally to the square root of the number of independent samples integrated, and can be used to define the predetermined number of time-domain samples upon which the strong signal's magnitude estimate is to be based. The error then can become small and the strong interference can be practically eliminated, e.g., r[n] can be expressed as:

$$r[n] \cong w_N[n]e^{j\theta[n]}. \quad (10)$$

As a result, the output of subtractor 140 can provide an accurate estimate of the weak signal component that is aligned along the strong signal instantaneous phase angle: $w_N[n]$. The other component of the weak signal, $w_T[n]$, is lost. This loss can be acceptable for many applications because eliminating the strong signal interference outweighs the loss of $w_T[n]$. Referring to FIG. 3, note that at any given instant, e.g., for the nth sample, uncertainty of the value of $w_T[n]$ can be relatively high because the angle of signal s[n] can be rotating rapidly, and the contribution of $w_T[n]$ to that angle cannot readily be determined. In comparison, for the nth sample, uncertainty of the value of $w_N[n]$ can be relatively low because the radius of the circle described by signal s[n] is known to a high certainty based on the estimated magnitude $\hat{A}[n]$. Thus, subtracting the value of $\hat{A}[n]$ from the total magnitude of that sample (s[n]+$w_N[n]$) can be considered to move $w_N[n]$ to the origin of the circle illustrated in FIG. 3. The magnitude of $w_N[n]$ can be determined using steps 210-240 of method 200 illustrated in FIG. 2, and the phase of $w_N[n]$ can be preserved through such steps and then used to transform $w_N[n]$ back into rectangular coordinates using step 250 of method 200 illustrated in FIG. 2.

Put another way, the output r[n] including suppression of the constant envelope signal for the nth sample can be expressed as:

$$r[n] = y[n] - \hat{s}[n] \quad (11).$$

The output of subtractor 140 therefore can be expressed as input y[n], which equals s[n]+w[n] per equation (1), minus an estimate $\hat{s}[n]$ of the signal s[n]. If the estimate $\hat{s}[n]$ is perfect, then the output r[n] would equal the desired weak signal plus additive Gaussian white noise w[n] exactly. Because this perfect case cannot necessarily be obtained, performance metrics can be used to quantify interference suppression performance such as described further below with reference to equations (13)-(15).

Referring again to FIG. 2, method 200 also includes obtaining time-domain samples in rectangular coordinates of the desired signal with reduced contribution from the interference signal based on the difference magnitude and the phase of the respective time-domain samples in polar coordinates (step 250). For example, polar to rectangular converter 150 illustrated in FIG. 1A can be configured to receive the difference magnitude for each time-domain sample in polar coordinates from subtractor 140 via input port 151, to receive the phase for each time-domain sample in polar coordinates from rectangular to polar converter 120 via input port 152, and to obtain time-domain samples in rectangular coordinates of the desired signal with reduced contribution from the interference signal based on the difference magnitude and the phase of respective time-domain samples in polar coordinates. FIG. 1D illustrates an exemplary "weak" desired signal following reduction, e.g., substantial cancellation, of the power of the "strong" interference signal illustrated in FIG. 1C. The resulting output signal r[n] in rectangular coordinates can be expressed as:

$$r[n] = w_N[n] \exp(j\theta[n]) \quad (12)$$

Based on the foregoing, it should be appreciated that the present systems and methods can substantially or completely cancel the interference signal, independently of the particular types of interference signal or desired signal. Such reduction of the power of the interference signal also can eliminate approximately half of the power of the desired signal, e.g., reduce the power of the desired signal by about 3 dB. However, benefits arising from substantially or completely canceling the interference signal can outweigh any reductions in the power of the desired signal.

Following steps 210-250 of method 200 illustrated in FIG. 2, the desired signal, having reduced contribution from the interference signal, then can be demodulated in a receiver such as illustrated in FIG. 1A or can be otherwise processed, e.g., transmitted to another user using a transponder such as illustrated in FIG. 1B.

Example

Figure 4A:
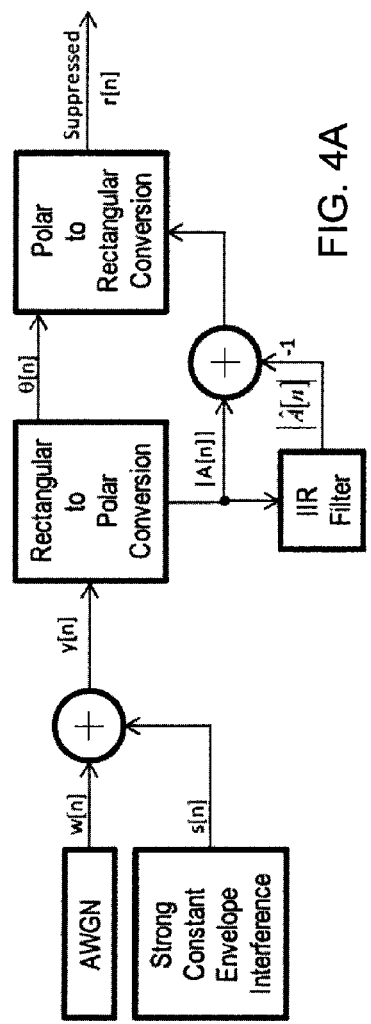
FIGS. 4A-4B schematically illustrate process flows used to computationally model a system and method for reducing a relatively high power, constant envelope interference signal that spectrally overlaps a relatively low power desired signal, according to some embodiments of the present invention.

FIG. 4A schematically illustrates a process flow used to computationally model a system and method for reducing a relatively high power, constant envelope interference signal that spectrally overlaps a relatively low power desired signal, according to one exemplary implementation of the present invention. For the purpose of the present example, the process flow was implemented using MATLAB® (The MathWorks, Inc., Natick, Mass.), but could be implemented using any suitable combination of software and hardware.

In the process flow illustrated in FIG. 4A, which can be implemented by a suitably programmed computer processor, the nth sample of the received, digitized, time-domain signal is called y[n], and was simulated by adding a strong constant envelope interference signal s[n] to a weak signal w[n] that includes additive white Gaussian noise (AWGN), corresponding to the signal received at step 210 of method 200 illustrated in FIG. 2. The processor converts y[n] to polar form in the time-domain, corresponding to step 220 of method 200. The processor then uses a filter, e.g., an infinite impulse response (IIR) filter, to average the magnitude A[n] of the input signal y[n] in polar coordinates over a pre-determined, relatively large number of samples to form a magnitude estimate Â[n], corresponding to step 230 of method 200 illustrated in FIG. 2. In the present example, the pre-determined number of samples was 100. It should be appreciated that the processor suitably could use another technique to form the magnitude estimate Â[n], such as a finite impulse response (FIR) filter or a weighted average, over any suitable number of samples. The average can be, but need not necessarily be, a running average. For example, the processor periodically could analyze a block of samples, or could apply an adaptive filter and analyze the filter response.

The processor then subtracts the absolute value |Â[n]| of the magnitude estimate from the absolute value |A[n]| of the corresponding sample, without altering the angle θ[n] of that sample, to obtain a difference magnitude, corresponding to step 240 of method 200 illustrated in FIG. 2. The processor then converts the difference magnitude and the corresponding angle θ[n] of each sample from polar coordinates to rectangular coordinates to provide an output r[n] that contains the weak signal plus noise with suppressed interference, corresponding to step 250 of method 200 illustrated in FIG. 2. Note that in the ideal case where interference suppression is complete, the r[n] residual signal can be considered to be an estimate of the weak signal plus noise without the interference signal.

The performance of a system or method for reducing a relatively high power, constant envelope interference signal that spectrally overlaps a relatively low power desired signal suitably can be characterized using a variety of metrics. For example, one potential metric is suppression which compares the power of the output digitized signal sample to the power of the corresponding input digitized signal sample. Given a strong interference signal at the input, interference suppression is expected to reduce the total power at the output. Expressing the input samples that are applied to the interference reduction system or method as y[n] and expressing the output samples from the system or method as r[n], then suppression can be defined as S and can be expressed as follows, in which variance is denoted by 'var' and the result has units in decibels:

$$S = 10\log_{10}\left(\frac{\text{var}(r[n])}{\text{var}(y[n])}\right) \quad (13)$$

Note that suppression may not necessarily provide meaningful information about how well the weak signal is preserved. For example, the trivial result r[n]=0 delivers tremendous suppression but also annihilates the weak signal. Successful interference suppression can sufficiently weaken the interference while sufficiently preserving the desired signal, e.g., such that the desired signal can be used to communicate desired information.

Another suitable metric is the signal residual error, which compares the estimate ŝ[n] of the strong signal s[n] to the power of the strong signal. The signal residual can be expressed as $R_s$ as follows:

$$R_S = 10\log_{10}\left(\frac{\text{var}(y[n] - r[n])}{\text{var}(s[n])}\right). \quad (14)$$

Note that in the case of perfect cancellation of the strong interference signal, y[n]−r[n]=s[n], which would result in $R_s$=0.

Following suppression of the strong signal, the noise residual can be used as a metric for the error in the weak signal plus estimated noise samples as compared to the actual noise power. The noise residual can be expressed as $R_N$ as follows:

$$R_N = 10\log_{10}\left(\frac{\text{var}(r[n] - w[n])}{\text{var}(w[n])}\right). \quad (15)$$

Because a weak signal and thermal noise can be grouped into one term w[n], the noise residual can express how faithfully the noise and weak signal are preserved. When this residual is small, then the suppressed output represents the weak signal and noise without substantial interference from the strong signal.

Figure 5:
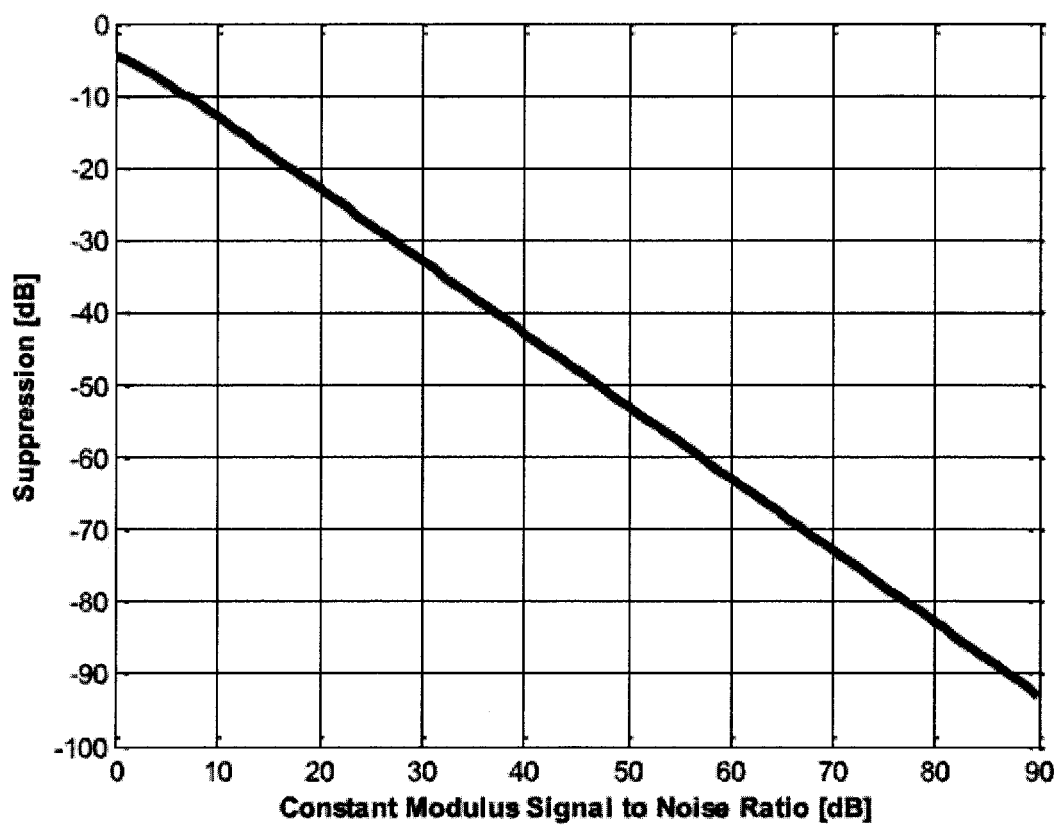
FIG. 5 is a plot of the suppression performance of the process flow of FIG. 4A for the interference signal, as a function of the signal to noise ratio of that signal, according to one exemplary implementation of the present invention.
Figure 6:
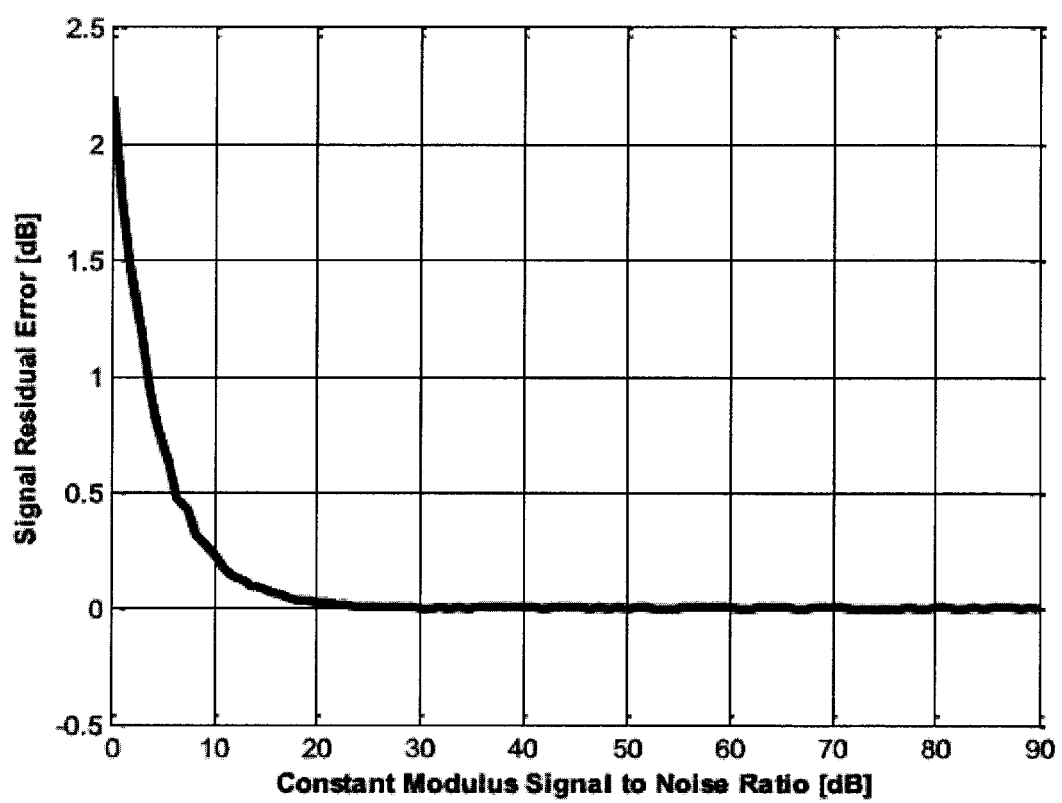
FIG. 6 is a plot of the interference signal residual performance of the process flow of FIG. 4A, as a function of the signal to noise ratio of that signal, according to one exemplary implementation of the present invention.
Figure 7:
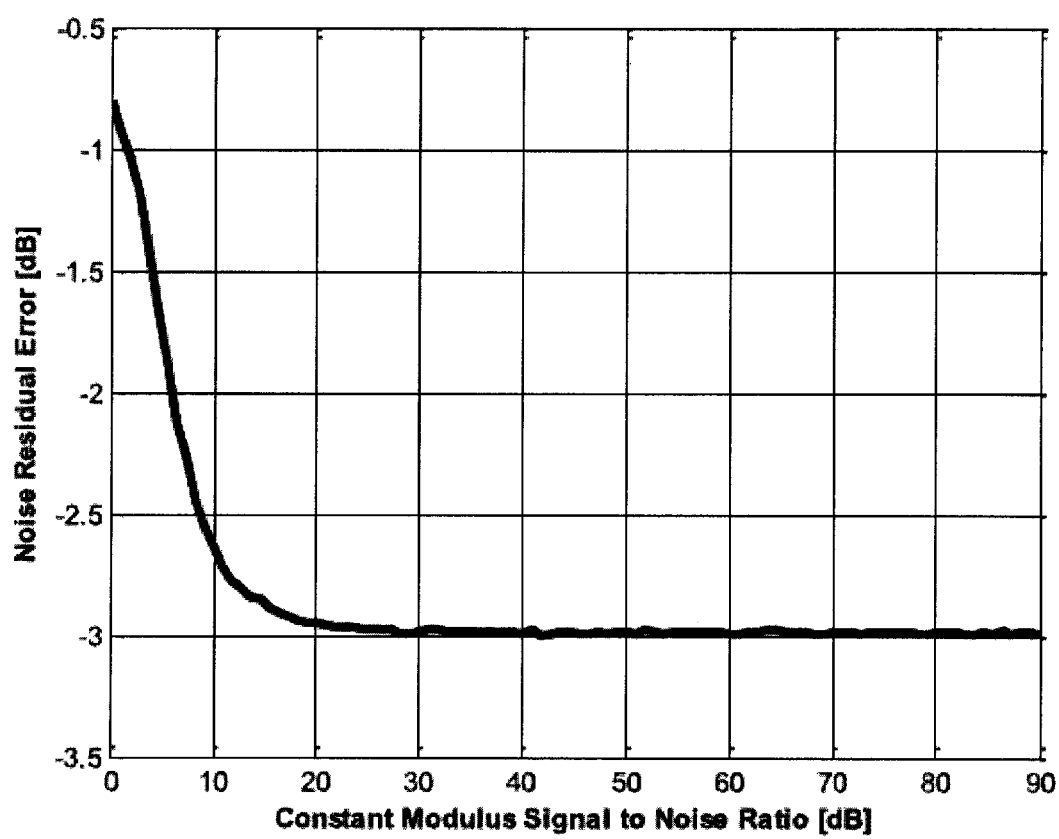
FIG. 7 is a plot of the noise residual error of the process flow of FIG. 4A, as a function of the signal to noise ratio of the interference signal, according to one exemplary implementation of the present invention.

In the present example, the above-mentioned metrics were used to characterize the performance of the process flow illustrated in FIG. 4A. For example, FIG. 5 is a plot of the suppression performance of the process flow of FIG. 4A for the interference signal, as a function of the signal to noise ratio of that signal, as determined using equation (13). It can be seen in FIG. 5 that the strong interference signal is suppressed to 3 dB below the noise floor. FIG. 6 is a plot of the interference signal residual performance of the process flow of FIG. 4A, as a function of the signal to noise ratio of that signal, as determined using equation (14). It can be seen in FIG. 6 that the process flow produces an 0.02 dB error at +20 dB SNR and 0.001 dB error at +30 dB SNR. As a result, the process flow can be characterized as accurately estimating the strong signal. FIG. 7 is a plot of the weak signal plus noise residual error of the process flow of FIG. 4A, as a function of the signal to noise ratio of the interference signal, as determined using equation (15). It can be seen in FIG. 7 how well the interference cancelled output matches the actual weak noise that is hiding beneath the strong signal. For example, even with an unknown power for the constant envelope interference signal that is above +20 dB SNR, it can be seen that the noise residual is approximately 3 dB below the channel noise floor. As the interference power increases further, increasing interference power is anticipated not to detrimentally impact the performance of the process flow until other real-world factors such as quantization or receiver non-linearity can become a factor.

Figure 4B:
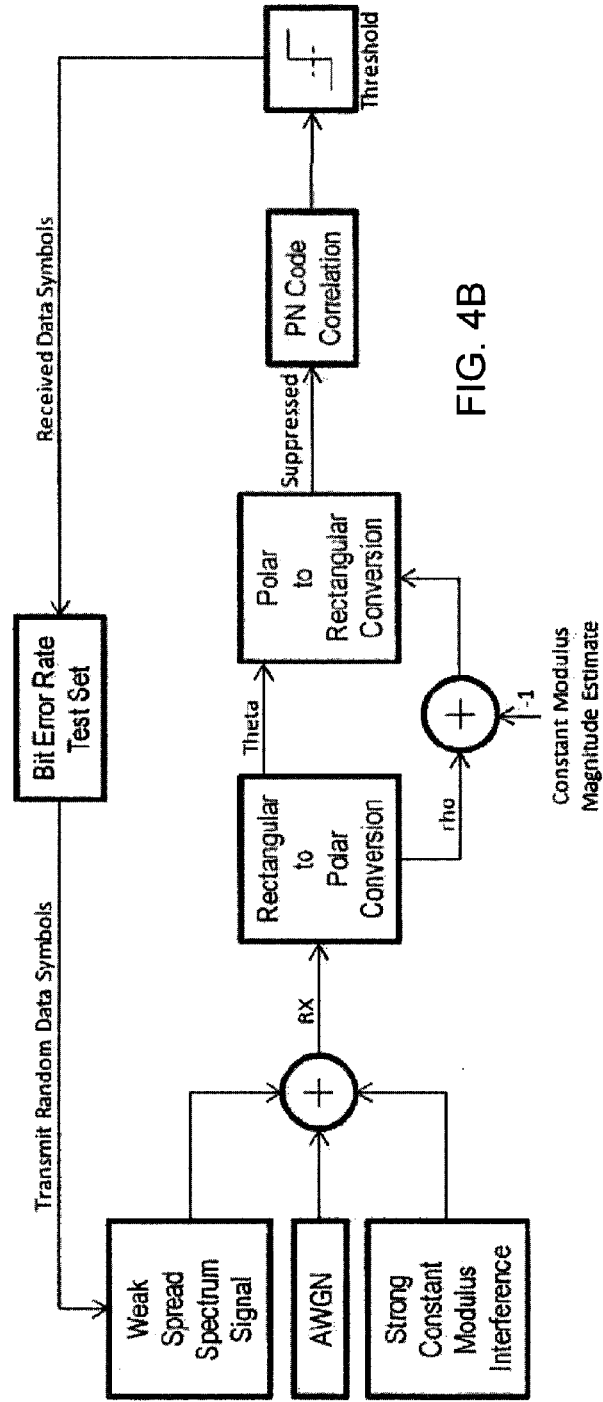

Another suitable metric for expressing the performance of a system or method for reducing a relatively high power, constant envelope interference signal that spectrally overlaps a relatively low power desired signal is the bit error rate (BER). FIG. 4B schematically illustrates a process flow used to computationally model a system and method for reducing a relatively high power, constant envelope interference signal that spectrally overlaps a relatively low power desired signal. In the example illustrated in FIG. 4B, a weak direct sequence spread spectrum (DSSS) signal at −10 dB signal to noise ratio was used as the desired signal. A strong constant envelope interference signal was simulated to deliver co-channel interference, and AWGN also was added. The interference power was varied to study the BER of the weak desired signal. It would typically be expected using a matched filter receiver that the weak signal BER performance would worsen as the interference power increases, but it was found in the present example that for sufficiently high levels of interference power, the weak signal BER actually improved.

Figure 8:
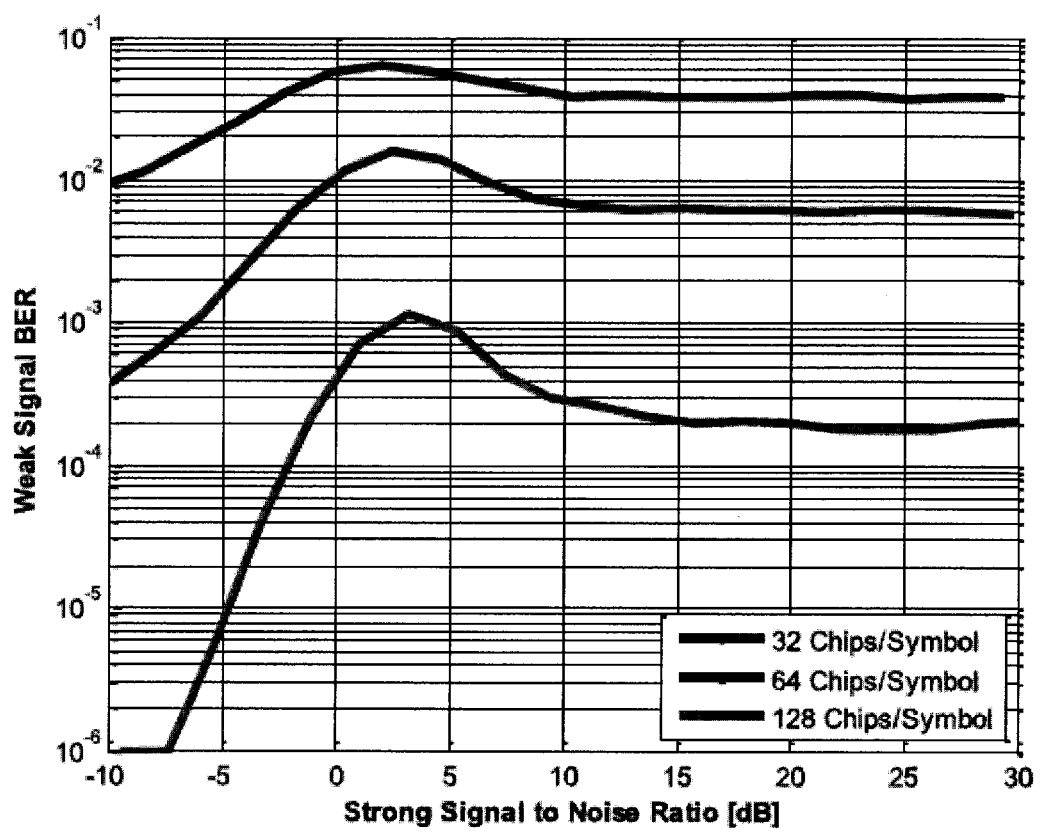
FIG. 8 is a plot of the bit error rate (BER) for various weak spread spectrum signals as the interference signal power is varied in the process flow of FIG. 4B, as a function of the signal to noise ratio of the interference signal, according to one exemplary implementation of the present invention.

More specifically, FIG. 8 is a plot of the bit error rate (BER) for various weak spread spectrum signals as the constant envelope signal power is varied in the process flow of FIG. 4B, as a function of the signal to noise ratio of the constant envelope signal. It may be seen in FIG. 8 that as the co-channel interference power is increased above +15 dB SNR, the weak DSSS signal BER appears to reach a floor. The BER floor may be worse than the weak signal in AWGN alone, so it may be appreciated that the simple interference cancellation process flow illustrated in FIG. 4B may not necessarily be perfect. Nonetheless, the performance is expected to provide useful communication in many circumstances. Additionally, the un-coded BER for the weak signal with 128 chips/sample can be seen to be approximately $2\times10^{-4}$ when the strong interference is at least +15 dB stronger than the thermal noise. Under this condition, the present systems and methods are expected to facilitate a weak signal is at least 25 dB weaker than the interference nonetheless being able to deliver useful communications. Communications using a weak signal further can be improved using known techniques, such as forward error correction (FEC) coding.

Additionally, in the present example, the desired weak signal uses binary phase shift keying modulation to convey data onto the quadrature phase shift keyed direct sequence spread spectrum signal. A BER of $2\times10^{-4}$ implies that the SNR at the matched filter output is approximately 8 dB. The processing gain is 21 dB for 128 independent samples per symbol. The implied input SNR is therefore 8 −21=−13 dB. This is 3 dB worse than the actual power ratio between the direct sequence spread spectrum signal and the thermal noise. This 3 dB penalty is caused by losing half of the desired signal as explained above with reference to equation (10). Provided that the interference is at least +15 dB stronger than the thermal noise, the interference can be suppressed almost entirely. The weak signal penalty arises from also losing half of the desired signal in the process. Note that the 3 dB penalty is compared to ideal reception if the interference source simply vanished or was perfectly removed somehow. Note that a previously known, optimal multi-user detector could deliver less than the 3 dB penalty, but the computational complexity can be much greater and can depend upon knowing specific details about the interference waveform. Given dynamic and unpredictable signals, the present approach can solve a wide variety of scenarios using comparatively fewer computing or hardware resources.

Additionally, it may be seen that in FIG. 8 that at SNR of approximately 3 dB, the BER of the weak signals simulated at the 32 chips/symbol, 64 chips/symbol, and 128 chips/symbol is at a maximum. Under such a condition, the power of the interference signal is insufficiently large compared to the power of the desired signal for one or more of the approximations described above to hold true. Additionally, it may be seen in FIG. 8 that even when the interference is as much as 40 dB stronger than the desired signal, the exemplary process flow of FIG. 4B provides satisfactory performance. In comparison, previously known matched filter receivers can be completely ineffective with this high level of interference. Optionally, the present systems and methods can include a matched filter or other previously known hardware for use in filtering interference having a power that is insufficiently large for the present systems and methods to operate effectively, and can be configured to switch back and forth between use of the present systems and methods and the previously known hardware appropriately based on the relative power of the interference signal.

Alternative Embodiments

Figure 9:
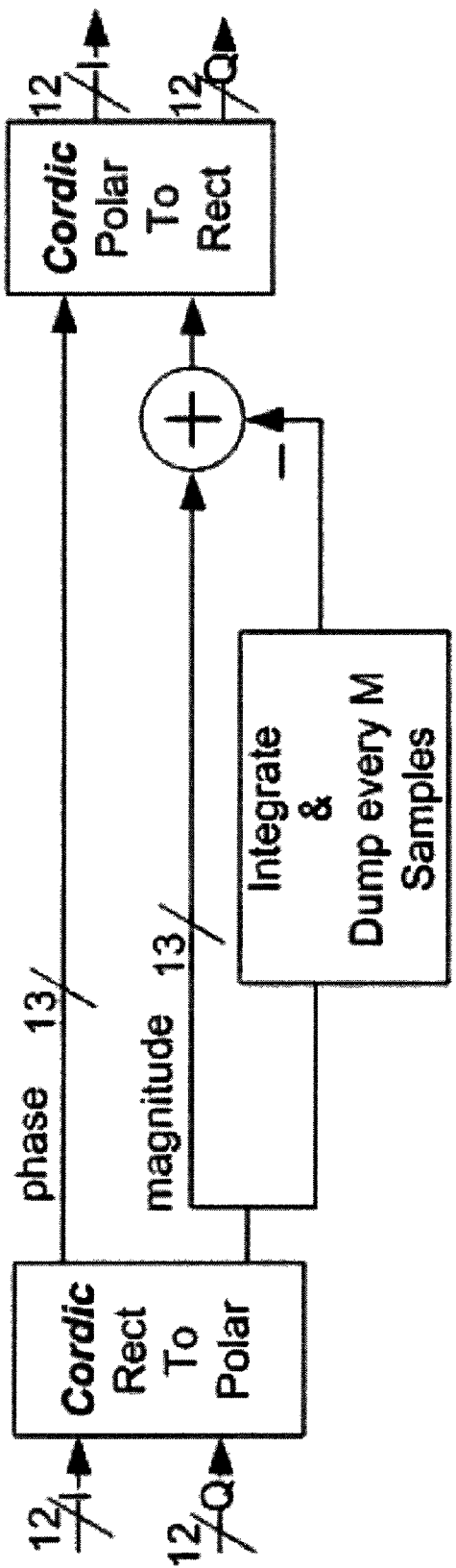
FIG. 9 illustrates an exemplary hardware implementation of a system for reducing a relatively high power, approximately constant envelope interference signal that spectrally overlaps a relatively low power desired signal in a receiver, according to one exemplary implementation of the present invention.

As noted above, the present systems and methods can be implemented using any suitable combination of hardware and software. FIG. 9 illustrates an exemplary hardware implementation of a system for reducing a relatively high power, approximately constant envelope interference signal that spectrally overlaps a relatively low power desired signal in a receiver. This particular implementation uses a commercially available FPGA, e.g., an V6LX760 (Xilinx Inc., San Jose, Calif.). The receiver was driven with analog radio frequency signals. A radio frequency (RF) and digital front-end conditioned the signals before suppression processing and provided samples at 180 MSPS. The samples were complex valued with 12 bits for each part.

As illustrated in FIG. 9, the FPGA transformed samples from rectangular to polar coordinates using an efficient CORDIC algorithm. The FPGA estimated the average magnitude of the samples in polar coordinates over a predetermined number of samples using a filter, although other hardware components for obtaining an average magnitude of the samples in polar coordinates can be used. Then the FPGA subtracted this average magnitude from the instantaneous magnitude of each sample. Efficient hardware implementation of such a subtraction step used only an accumulator as an integrate and dump, although other hardware components for obtaining a difference magnitude can be used. Restricting the number of integrated samples to a power of two can facilitate relatively efficient scaling by simply shifting bits. Because the instantaneous magnitude was sometimes less than the estimated magnitude, some of the difference magnitudes had negative magnitude values after subtraction. The FPGA included another CORDIC algorithm to transform the signal back into rectangular coordinates. This second transformation was implemented as a coordinate rotation. Coordinate rotation handles potentially negative magnitude values with ease because the real part can be positive or negative. The imaginary part is set to zero and the signal phase is restored by rotating the real part to θ[n]. The FPGA included a first-in-first-out (FIFO) buffer to correctly align the timing for the phase angle of a sample with the difference magnitude of that sample when transforming that sample back into rectangular coordinates.

The performance of the system illustrated in FIG. 9 was characterized. For example, using suppression equation (13), it was found that the system provided more than 50 dB of suppression for a wide variety of interference signals. The weak signal plus noise residual error of the system, determined using equation (15), was found to range from 3-5 dB depending on the particular test.

It is expected that configuring the present interference magnitude estimator to a relatively long integration time—corresponding to a relatively large number of samples—can yield favorable results for constant envelope interference signals. Fading signals or signals with non-constant envelope can benefit from a shorter integration time. As the integration time approaches zero the suppression increases, but the suppressed output signal becomes nearly zero. Thus it is expected that the present systems and methods may suitably may be used for reducing interference signals with relatively slowly varying envelopes as compared to the sample rate.

It should be appreciated that the present systems and methods suitably can be implemented so as to reduce the effects of relatively high power, approximately constant envelope interference in any practical application. As an example application, the present systems and methods can provide an advantage as compared to cognitive radio. Suppose there are two co-channel signals. If one signal is much stronger than the other, then the strong signal is typically easy to detect and demodulate, but the weaker signal can be lost in the interference without appropriate remediation. For this reason, cognitive radios seek unoccupied parts of the spectrum. The present systems and methods can work alone, or as a supplement to cognitive radio, by reducing interference at the receiver. This can allow more signals to share the spectrum and provide the opportunity to use whatever portion of the spectrum is needed whenever it is needed.

Other exemplary practical applications that can benefit from the present systems and methods include, but are not limited to, the following:

Satellite communications, in which the present systems and methods can facilitate suppression of a wide variety of common interference signals, and can protect SATCOM from local interference;

Commercial wireless communications, in which the present systems and methods can solve the near-far problem and packet collisions known in the art;

LPI (low probability of intercept) and LPD (low probability of detection) communications, in which the present systems and methods can facilitate hiding weak desired signals under strong signals such that only authorized users readily can find the weak desired signals; or Anti jam receivers, in which the present systems and methods can facilitate resistance to a wide variety of potential jamming sources, whether such sources are intentional or unintentional, including consumer goods that can radiate unauthorized energy into critical military use bands.

While various illustrative embodiments of the invention are described above, it will be apparent to one skilled in the art that various changes and modifications can be made therein without departing from the invention. For example, interference reduction system 100 can be configured to work with, and to be coupled to, a pre-existing receiver 10 or transponder 10', but need not necessarily be considered to be an integral part of such a receiver or transponder, and indeed suitably can be used with any circuitry that would benefit from interference reduction. Additionally, although the above embodiments primarily have been described with reference to digital implementations, it should be appreciated that the present systems and methods suitably can be implemented in the analog domain, using analog hardware. The appended claims are intended to cover all such changes and modifications that fall within the true spirit and scope of the invention.

What is claimed:

1. A system for processing time-domain samples of a digitized signal in rectangular coordinates, the digitized signal including a relatively low power desired signal and a relatively high power, approximately constant envelope interference signal that spectrally overlaps the desired signal, the system comprising:
   a rectangular to polar converter configured to obtain a magnitude and a phase of each time-domain sample of the digitized signal in polar coordinates;
   an interference magnitude estimator configured to estimate a magnitude of the interference signal based on the respective magnitudes of a predetermined number of the time-domain samples in polar coordinates;
   a subtractor configured to obtain a difference magnitude for each of the time-domain samples in polar coordinates based on the magnitude of that sample and the estimated magnitude of the interference signal in polar coordinates; and
   a polar to rectangular converter configured to obtain time-domain samples in rectangular coordinates of the desired signal with reduced power of the interference signal based on the difference magnitude and the phase of respective time-domain samples in polar coordinates,
   wherein the power of the interference signal is at least ten times as large as the power of the desired signal.

2. The system of claim 1, wherein the interference estimator comprises an arithmetic circuit.

3. The system of claim 1, wherein the subtractor comprises an arithmetic circuit.

4. The system of claim 1, wherein the envelope of the interference signal is constant over at least ten of the time-domain samples of the digitized signal.

5. The system of claim 4, wherein the envelope of the interference signal is constant over at least 100 of the time-domain samples of the digitized signal.

6. The system of claim 1, wherein the power of the interference signal is at least 100 times as large as the power of the desired signal.

7. The system of claim 1, further comprising an antenna and an analog-to-digital converter, the antenna configured to receive an analog, time-domain signal including the relatively low power desired signal and the relatively high power, approximately constant envelope interference signal that spectrally overlaps the desired signal, the analog-to-digital converter configured to digitize the analog, time-domain signal to form the digitized signal.

8. A system for processing time-domain samples of a digitized signal in rectangular coordinates, the digitized signal including a relatively low power desired signal and a relatively high power, approximately constant envelope interference signal that spectrally overlaps the desired signal, the system comprising:
   a rectangular to polar converter configured to obtain a magnitude and a phase of each time-domain sample of the digitized signal in polar coordinates;
   an interference magnitude estimator configured to estimate a magnitude of the interference signal based on the respective magnitudes of a predetermined number of the time-domain samples in polar coordinates;
   a subtractor configured to obtain a difference magnitude for each of the time-domain samples in polar coordinates based on the magnitude of that sample and the estimated magnitude of the interference signal in polar coordinates; and
   a polar to rectangular converter configured to obtain time-domain samples in rectangular coordinates of the desired signal with reduced power of the interference signal based on the difference magnitude and the phase of respective time-domain samples in polar coordinates, wherein the interference magnitude estimator is configured to estimate the magnitude of the interference signal based on an average of the magnitudes of the predetermined number of the time-domain samples in polar coordinates.

9. The system of claim 8, wherein the average is a running average.

10. A method for processing time-domain samples of a digitized signal in rectangular coordinates, the digitized signal including a relatively low power desired signal and a relatively high power, approximately constant envelope interference signal that spectrally overlaps the desired signal, the method comprising:
   obtaining a magnitude and a phase of each time-domain sample in polar coordinates;
   estimating a magnitude of the interference signal based on the respective magnitudes of a predetermined number of the time-domain samples in polar coordinates;
   obtaining a difference magnitude for each of the time-domain samples in polar coordinates based on the magnitude of that sample and the estimated magnitude of the interference signal in polar coordinates; and
   obtaining time-domain samples in rectangular coordinates of the desired signal with reduced power of the interference signal based on the difference magnitude and the phase of respective time-domain samples in polar coordinates,
   wherein the power of the interference signal is at least ten times as large as the power of the desired signal.

11. The method of claim 10, wherein the magnitude of the interference signal is estimated using an arithmetic circuit.

12. The method of claim 10, wherein the difference magnitude is obtained using an arithmetic circuit.

13. The method of claim 10, wherein the envelope of the interference signal is constant over at least ten of the time-domain samples of the digitized signal.

14. The method of claim 13, wherein the envelope of the interference signal is constant over at least 100 of the time-domain samples of the digitized signal.

15. The method of claim 13, wherein the power of the interference signal is at least 100 times as large as the power of the desired signal.

16. The method of claim 10, further comprising receiving an analog, time-domain signal including the relatively low power desired signal and the relatively high power, approximately constant envelope interference signal that spectrally overlaps the desired signal, and digitizing the analog, time-domain signal to form the digitized signal.

17. A method for processing time-domain samples of a digitized signal in rectangular coordinates, the digitized signal including a relatively low power desired signal and a relatively high power, approximately constant envelope interference signal that spectrally overlaps the desired signal, the method comprising:
   obtaining a magnitude and a phase of each time-domain sample in polar coordinates;
   estimating a magnitude of the interference signal based on the respective magnitudes of a predetermined number of the time-domain samples in polar coordinates;
   obtaining a difference magnitude for each of the time-domain samples in polar coordinates based on the magnitude of that sample and the estimated magnitude of the interference signal in polar coordinates; and
   obtaining time-domain samples in rectangular coordinates of the desired signal with reduced power of the interference signal based on the difference magnitude and the phase of respective time-domain samples in polar coordinates,
   wherein the magnitude of the interference signal is estimated based on an average of the magnitudes of the predetermined number of the time-domain samples in polar coordinates.

18. The method of claim 17, wherein the average is a running average.

* * * * *